Sept. 26, 1933.                    D. W. BERLIN                    1,928,244
                AUTOMATICALLY VARIABLE CHANGE SPEED GEAR DEVICE
                  Filed Jan. 23, 1932            3 Sheets-Sheet 1
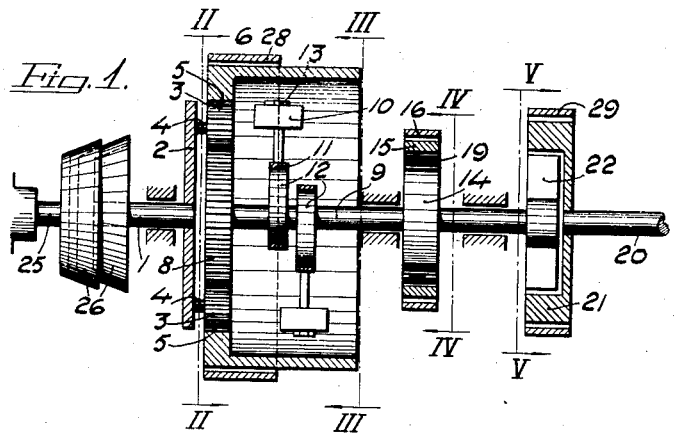
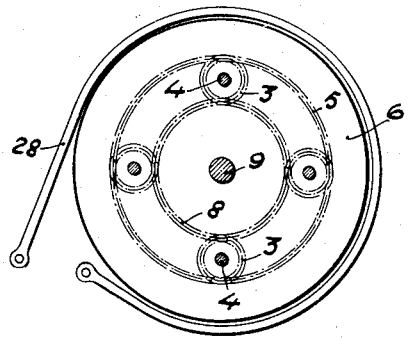
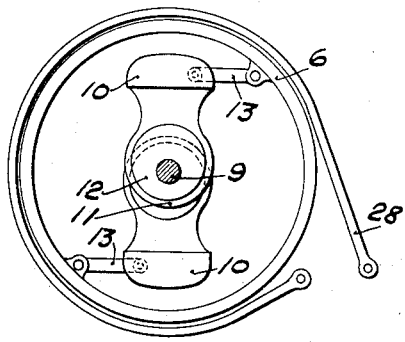
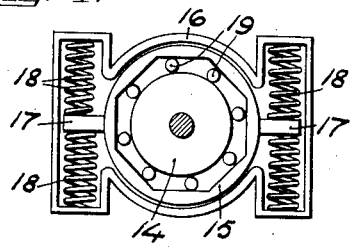
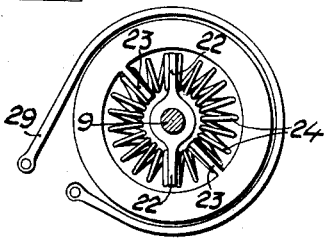
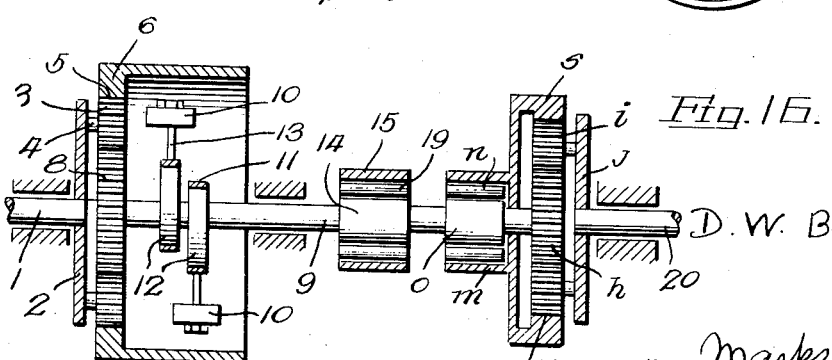
D. W. Berlin
INVENTOR
By: Marks & Clerk
Attys.

Sept. 26, 1933.    D. W. BERLIN    1,928,244
AUTOMATICALLY VARIABLE CHANGE SPEED GEAR DEVICE
Filed Jan. 23, 1932    3 Sheets-Sheet 2
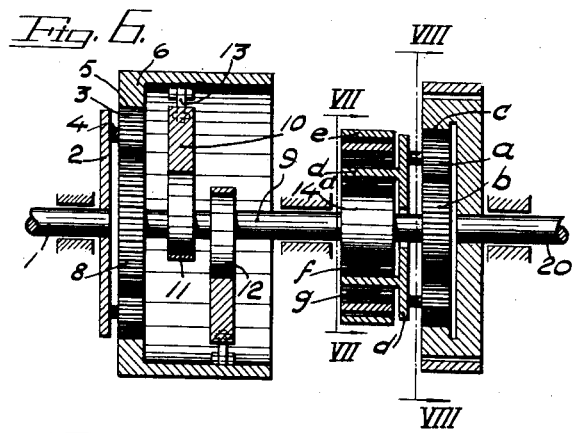
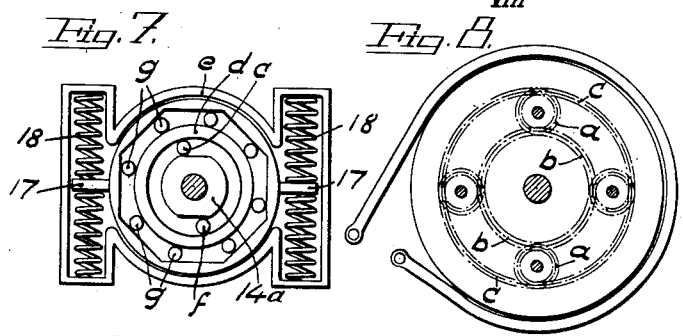
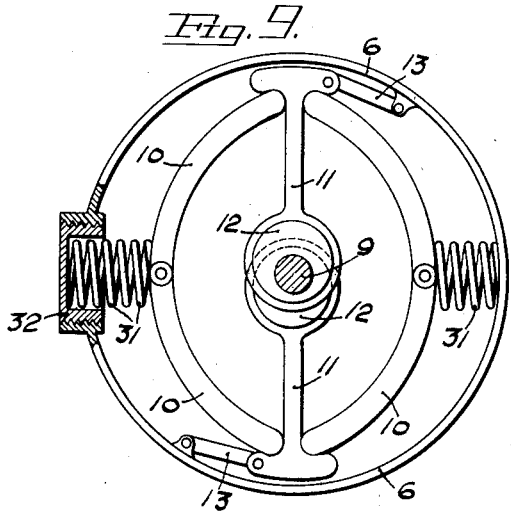
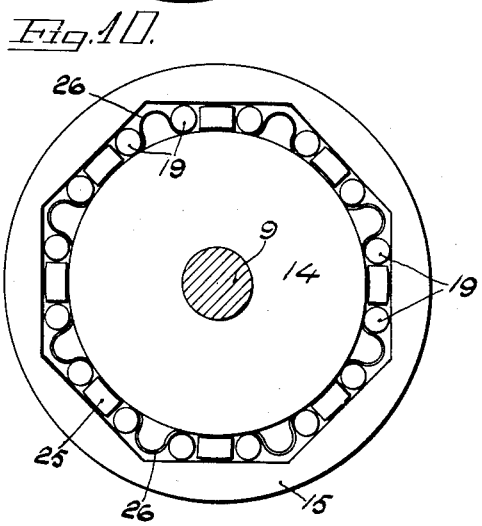
D. W. Berlin
INVENTOR
By: Marks & Clerk
ATTYS.

Sept. 26, 1933.   D. W. BERLIN   1,928,244
AUTOMATICALLY VARIABLE CHANGE SPEED GEAR DEVICE
Filed Jan. 23, 1932   3 Sheets-Sheet 3
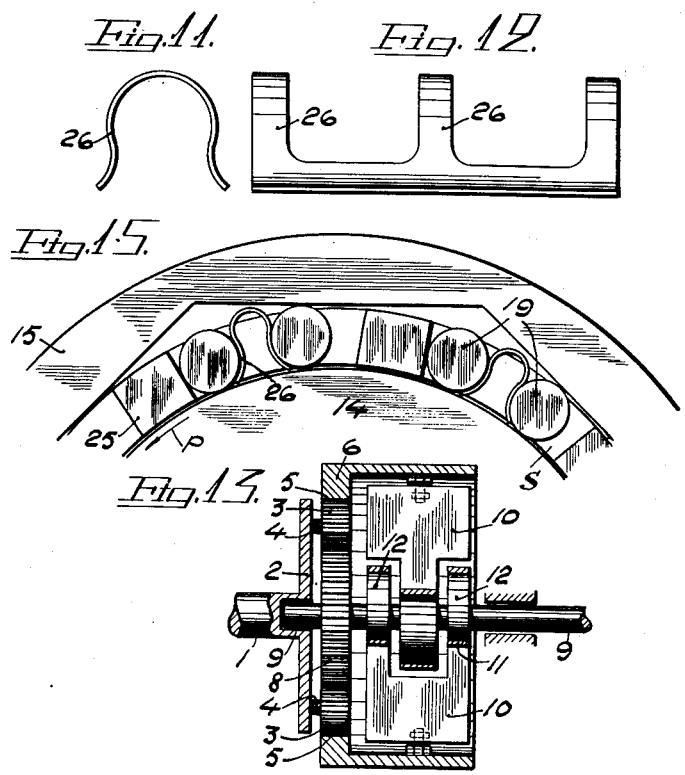
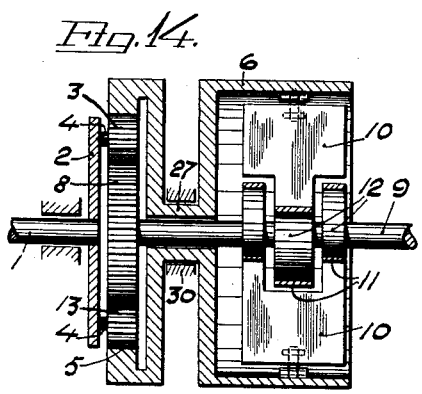
D. W. Berlin
INVENTOR
By: Marks & Clerk
ATTYS.

Patented Sept. 26, 1933

1,928,244

UNITED STATES PATENT OFFICE 1,928,244

AUTOMATICALLY VARIABLE CHANGE SPEED GEAR DEVICE

David Werner Berlin, Rasunda, Sweden

Application January 23, 1932, Serial No. 588,466, and in Sweden May 28, 1931

6 Claims. (Cl. 74—34)

The present invention relates to an automatically variable change speed gear device for automatically transforming a torque with great speed of revolutions and little moment of torsion into a torque with less speed of revolutions but greater moment of torsion according to the resistance to be overcome. Said device will act under most gear conditions, from the gear ratio being 1:1, corresponding to direct coupling, to the torque of the driven shaft being so great that the latter is practically motionless and the gear ratio very great. The transmission of power from the driving or primary shaft to the driven or secondary shaft is effected, up to a certain moment of resistance, by direct coupling and above that by cooperation of the driving primary moment, the centrifugal force and the active force of the primary mass, which are together partly transformed into and give a greater moment of torsion than the primary moment. With such a transformation of the primary moment the secondary shaft may be brought to rotate both in the direction of rotation of the primary shaft and in the opposite direction, rotate forward or backward.

The present invention is especially applicable to automobiles and other motor vehicles because it brings a solution of all operating problems met with in driving such vehicles. The following requirements are, according to those skilled in the art, indispensable for an ideal automatic gearbox for automobiles:

1. Automatical increasing of the driving moment when resistance is met with in moving forward.

2. Automatical increasing of the driving moment when resistance is met with in moving backward.

3. Possibility of using the motor as a brake when driving downhill.

4. Possibility of using the motor as a brake when sudden stop of the vehicle is desired.

5. Relative free movement in driving forward when the force of acceleration of the vehicle is sufficient for moving the same.

6. Double braking of the Cardan shaft, controllable by means of a lever.

7. That a disc clutch or cone coupling may be attached to or omitted from the gear box.

The present invention includes all the technical mechanical members and combinations necessary for effecting all the operations and movements mentioned above.

The principle object of the present invention is an automatically working variable change speed gear device, in which the moment of torsion of the prime mover, the motor, is, when so required, automatically transmitted from the primary shaft to the secondary shaft or an intermediate shaft or member by means of rotating centrifugal mass and flying mass and in which the primary shaft is coupled both to primary fixed and free rotating mass and to the secondary or intermediate shaft by a planetary gear or the like or by gears of single or double construction so that free rotating cog wheels mounted on the primary shaft are gearing both with the rotating primary mass and with the secondary or intermediate shaft.

Further the primary shaft is at the same time coupled to both the primary fixed and free rotating mass and the secondary shaft or the intermediate shaft by means of planetary gear or gears and pivotally or otherwise between them mounted centrifugal weights carried by and pivoted on excentrics or cranks of the secondary or intermediate shaft. Thus the primary fixed and free mass and the secondary or the intermediate shaft are always gearing with one another, said gearing allowing different number of revolutions between the fixed as well as the free primary mass and the secondary or intermediate shaft. The intermediate shaft, if such a shaft exists, is preferably connected to the secondary shaft (in motor vehicles the Cardan shaft), by means of a spring drive with flying mass, which smoothes the positive impulses of the centrifugal weights, so that an approximately constant moment of torsion is exerted on the secondary shaft. Another form of construction of the connection between the intermediate shaft and the secondary shaft consists in the coupling being obtained by means of a single or double planetary gear system or the like arranged to rectify the movement and to transmit the positive as well as the negative impulses of the centrifugal weights from the intermediate shaft to the secondary shaft.

A number of constructional forms of the invention are represented, by way of example, in the accompanying drawings:

Fig. 1 is longitudinal section of a change speed gear device according to the principal features of the invention with direct coupling to the secondary shaft.

Figs. 2, 3, 4 and 5 are transverse sections of the mechanism shown in Fig. 1, taken on lines with the same numbers.

Fig. 6 is a longitudinal section of a change speed gear device according to the principal features of the invention but with a variable double-acting coupling to the secondary shaft.

Figs. 7 and 8 are transverse sections taken on lines 7—7 and 8—8 of Fig. 6.

Fig. 9 is a transverse section of a special constructional form of the centrifugal weights of the change speed gear device according to Figs. 1 and 6.

Fig. 10 is a transverse section of the check-coupling, by means of which the sense of rotation is controlled.

Figs. 11 and 12 show the spring of Fig. 10.

Figs. 13 and 14 are longitudinal sections of constructional forms of the change speed gear device according to Figs. 1 and 6.

Fig. 15 shows, on an enlarged scale, detail of the check-coupling of Fig. 10 with the members in other positions.

Fig. 16 shows a longitudinal section of a modified embodiment of the invention.

According to Figs. 1-6 the primary shaft 1 and the fly wheel 2 are, by means of planet wheels 3 mounted upon journals 4 which are fixed to the fly wheel 2, meshing partly with an internal gear 5 provided with the primary free rotating flying mass 6, which enclose or carry the centrifugal gear device, and partly with the centre wheel 8 secured to the intermediate shaft 9, which may alternatively be the secondary shaft. The primary free rotating mass 6 is connected to the intermediate shaft 9 by means of the centrifugal gear device, which consists of the centrifugal weights 10, said weights 10 being by means of excentric straps 11 pivotally mounted on excentrics 12 secured to the intermediate shaft 9. The centrifugal weights 10 are further connected to the free flying mass 6 through the rods 13, whereby a direct connection between the flying mass 6 and the intermediate shaft 9 is obtained. The intermediate shaft 9 or the secondary shaft is provided with a check device determining the direction of rotation of the shaft. The check device consists of a cylindrical member 14 secured to the shaft 9 and surrounded by a casing 15, which may be mounted in an external casing 16 and provided with lugs or other devices 17 (Fig. 4) resting against springs or other elastic members 18 on either side, so that the casing 15 may perform a certain reciprocating rotative movement. Between the member 14 and the casing 15 is inserted a ring with rollers 19. The internal surface of the casing 15 (alternatively the external surface of the member 14) is formed with a number of planes or curves, so that the rollers engage the member 14 when said member 14 endeavours to rotate in one direction but release said member 14 when it is rotating in the opposite direction. It is presumed that the rollers are inserted between springs in the ring, though this is not shown in Fig. 4.

A fly wheel 21 is secured to the secondary shaft 20 and a member 22 provided with wings is secured to the intermediate shaft 9. Between the member 22 and wings 23 secured to the inside of the fly wheel there are inserted springs or other elastic members 24. The fly wheel 21 may on the contrary be secured to the intermediate shaft 9 and the member 22 to the secondary shaft, the spring motion between the intermediate shaft and the secondary shaft then being effected in the opposite direction. The primary shaft 1 may be connected to the motor shaft 25 by means of a usual cone coupling 26 (alternatively a disc clutch) which may in certain cases be advantageous to the operation. The cylindrical member 14 may be elastically attached to the intermediate shaft 9 so that the yielding which is in the construction described above intended to be absorbed by the spring loaded casing may be on the contrary absorbed directly between the member 14 and the shaft 9.

When the gear device is in operation the centrifugal weights 10 actuate the excentrics or cranks 12 of the secondary or the intermediate shaft in a manner known per se so that the secondary or intermediate shaft 9 during one half revolution endeavours to rotate in one direction and during the other half revolution endeavours to rotate in the opposite direction.

In order to make the rotation of the intermediate shaft unidirectional for forward or reverse drive and to utilize at the same time the energy produced during the negative half revolution, the secondary or intermediate shaft 9 is provided with an adjustable check device 14—15—16 effective in both directions and arranged to prevent the shaft 9 from being rotated backwards against the direction of rotation during the negative half revolution.

When the torque of the secondary shaft or intermediate shaft 9 is greater than the turning moment of the primary shaft 1, the centrifugal weights 10 exert during the positive half revolution a turning action on the secondary shaft or intermediate shaft 9 in the direction of rotation by means of the members 11 and exert during the negative half revolution, when the shaft 9 is checked by the check device 14—15—16, a drawing action on the free primary masses 6 thus increasing their active force, which is thereafter utilized during the positive half revolution. For the purpose of smoothing the impulses during the gearing the intermediate shaft 9 is connected to the secondary shaft 20 through the elastic coupling which is provided with the fly wheel 21 and in which the elastic members 24 are pressed in between the intermediate shaft 9 and the fly wheel 21 which is secured to the secondary shaft 20. The planetary gear consisting of the wheels 3—5 and 8 effects more rapid impulses and more uniform motion during the gearing, which is obtained by the velocity of rotation of the primary masses 6 being increased during the negative half revolution because of the fact that the wheel 8 stands relatively still as the wheels 3 roll thereon and in some respect release the internal gear 5, so that the wheel 6 can swing forward in the direction of rotation with a greater velocity. In the check device for controlling the direction of rotation of the secondary or intermediate shaft 9, the member 14, which is secured to the shaft 9, is formed with even or, may be, cylindrical surfaces of engagement while the member 15 has ground-in plane or curved surfaces for each check roller 19.

These surfaces are formed in such a manner that the rollers 19 by displacement in one or the other direction prevent the intermediate shaft 9 from rotating in that direction. The rollers 19 are held by springs or the like in a holder (not shown) by means of which the rollers may be displaced from one position to the opposite one. See Fig. 10.

In Figs. 6–8 the primary shaft 1, the fly wheel 2, the planet wheels 3, the pins 4, the internal gear 5, the fly wheel 6, the centre wheel 8, the intermediate shaft 9, the centrifugal weights 10, the excentric clips 11, the excentrics 12 and the rods 13 are identical with the corresponding parts of Fig. 1. The check member 14a is different from the member 14 therein, that parts of the member 14a are ground off for obtaining engagement with rollers $f$. The new feature of this constructional form of the invention consists therein that, when the gear device is in operation, the centrifugal weights 10 exert a rotating action upon the excentrics 12 in such a manner that the intermediate shaft 9 is rotated both in the positive and in the negative direction, the movement of the intermediate shaft 9 in the negative direction being transformed into a positive movement by means of a planetary gear $a$, $b$, $c$, inserted between the intermediate shaft 9 and the secondary shaft 20, said transformed movement being transmitted to the secondary shaft 20 in the positive direction, so that the positive as well as the negative half revolutions co-operate alternately and drive the secondary shaft 20 in the same direction. In order that the intermediate shaft 9 shall be able to transmit both direct motion and reduced or geared motion from the primary shaft 1 to the secondary shaft 20, the intermediate shaft 9 is variably connected to the secondary shaft 20 by means of the planetary gear $a$, $b$, $c$, which variably connects said intermediate and secondary shafts with each other.

The intermediate shaft is further, in order to obtain forward and backward motion of the secondary shaft 20 and to enable gearing in both directions, check-coupled in one direction to the intermediate member $d$ of said planetary gear by means of the rollers $f$ whilst said member $d$ is check-coupled in the opposite direction to the framing or casing $e$ by means of rollers $g$. These directions, however, may be reversed for changing the direction of rotation of the secondary shaft 20, which reversion may be effected by means of co-operating levers, wedges or gear wheel devices. In order to eliminate a possible liability to shocks in the check-coupling between the intermediate member $d$ of the planetary gear and the framing $e$, the member $d$ is in both directions reversibly check-coupled to an intermediate member turnably mounted in the framing $e$ and elastically fastened thereto said intermediate member being arranged to absorb shocks and to give them off in the form of turning impulses in the direction of rotation. The center wheel $b$ of the planetary gear is secured to the intermediate shaft 9 and the planet wheels $a$ are rotatably mounted upon the intermediate member $d$ which is turnable about the intermediate shaft 9. The internal gear $c$ is secured to the secondary shaft 20 and meshes with the planet wheels $a$. The internal gear $c$ is shaped as a fly wheel in order to smooth the motion and to eliminate eventual shock-causing variations in the load of the planetary gear $a$, $b$, $c$.

The operation of the automatically variable change speed gear device described above is as follows: The primary shaft 1 is brought into rotation by the prime mover and causes the members 2, 6 and 10 to revolve. If the load torque of the secondary shaft 9 is less than the torque produced by the centrifugal force of the weights 10 on the excentrics 12, the intermediate shaft 9 remains direct coupled to the primary shaft 1. If the member $d$ of the planetary gear is at the same time check-coupled to the intermediate shaft 9 in the direction of rotation, then the wheels $a$ and $b$ are locked together as a unit and cause the wheel $c$ and the secondary shaft 20 to take part in the rotation. If on the contrary the load torque of the intermediate shaft 9 is greater than the torque produced by the centrifugal force of the weights 10 upon the excentrics 12, the speed of revolutions of the motor will be increased automatically in consequence of decreased load until the centrifugal force has become sufficient to turn the excentrics 12. Then the intermediate shaft 9 will be turned forward in the direction of rotation during the positive period and will by means of the check rollers $f$, cause the member $d$ and the whole planetary gear as well as the secondary shaft 20 to take part in the rotation. During the negative period or half revolution the member $d$ is quiet due to the checking action of the rollers $g$. Because of the fact that the wheel $b$ is at the same time rotating in the negative direction, the wheels $a$ are brought into rotation in the positive direction and cause the wheel $c$ and the secondary shaft 20 also to rotate in this direction during the negative period.

In order to obtain reverse motion of the secondary shaft 20, the check-couplings $f$ and $g$ are reversed to the opposite positions. Between the wheel $c$ and its flying mass or the secondary shaft 20 there may be inserted a shock-absorbing spring drive in order still more to smooth the motion at direct coupling as well as gearing.

Fig. 16 shows another constructional form of the invention. That part of the construction, which consists of the primary shaft 1, the fly wheel 2, the planet wheels 3, the pins 4, the internal gear 5, the flying mass 6, the centre wheel 8, the intermediate shaft 9, the centrifugal weights 10, the excentric straps 11, the excentrics 12, the rods 13, the check member 14, the casing 15, the rollers 19 and the secondary shaft 20, is identic with the corresponding parts shown in Fig. 1. In Fig. 16, however, the intermediate shaft 9 is rotatable with respect to the secondary shaft 20 by means of a planetary gear consisting of the centre wheel $h$ secured to the intermediate shaft 9, the planet wheels $i$ rotatably mounted on the wheel $j$ which is secured to the secondary shaft 20. The planetary gear further comprises the internal gear $k$, the flying mass $s$ and the cylindrical member $m$, which is on the inner side checked against the cylindrical member $o$ of the secondary shaft 9 by means of rollers $n$.

This form of the connection between the intermediate shaft 9 and the secondary shaft 20 acts in such a manner that when the intermediate shaft 9 is checked against motion in a certain direction, the flying mass $s$ is at the same time checked against motion in the same direction, whereby the wheels $i$, the disc $j$ and the secondary gear 20 are brought into rotation in said positive direction, but during the negative period the mass $s$ continues its motion in positive direction by rolling of the wheels $i$ upon the wheel $h$, so that consequently the disc $j$ and the secondary shaft 20 continue to rotate in positive direction and later on obtain a new positive impulse. In this constructional form a completely balanced continual positive motion of the secondary shaft 20 is obtained. In direct coupling for braking by the motor down hills it is in this case necessary to reverse the check-coupling $m$, $n$, $o$ by hand to the opposite position, which is a very simple operation.

Fig. 9 shows a special form and operation of the centrifugal weights, characterized by the torque of the primary shaft being transmitted to the secondary shaft 9 (or the intermediate shaft), when the torque of the latter is greater than that of the primary shaft, by means of centrifugal weights 10 attached by means of rods 13 to the flying mass 6 of the primary shaft and carried by members 11 mounted upon and revolving about the excentrics 12 of the secondary shaft 9. The centrifugal weights 10 are pivotally connected to the members 11 and spring-loaded by springs 31 inserted between the flying mass 6 of the primary shaft and the centrifugal weights 10.

In order that the centrifugal weights 10 shall be of completely uniform action with respect to each other, they are pivotally connected to each other, so that a complete chain is obtained. The centrifugal weights 10 may either be connected to the members 11 by means of a common pin or by means of different pins, one for each centrifugal weight. Further the centrifugal weights may be at the opposite end, pivotally connected to each other by means of a common pin or by means of an intermediate member and different pins. In the connection points there are springs inserted said springs pressing against the walls 6. The springs 9 are given a suitable compression. In order that the centrifugal weights 10 shall act in the most advantageous way, they are made considerably heavier in the proximity of the ends connected to the members 11 than in the proximity of the opposite ends carried by the springs, which last mentioned ends are of a considerably lighter construction. The centrifugal weights 10 are pressed in, by means of the springs, between the members 11 and the primary flying mass 6, whereby the spring pressure effects direct coupling between the primary shaft and the secondary shaft at a certain torque.

When during operation the torque of the secondary shaft or the intermediate shaft becomes greater than that of the primary shaft, then the members 11 endeavour to pass the centre of the excentrics 12. This is effected by the active force of the primary flying mass being partly consumed and then the intermediate shaft or the secondary shaft 9 is turned a little and the centrifugal weights are thereafter brought to pass the centre of the excentrics 12. After such passing the centre, the weights 10 are forcibly launched outwards and forwards and cause an impulse to be imparted to the primary flying mass 6 by means of the rods 13, said primary flying mass 6 then aiding the motor to bring the weights again to pass the centre. During these movements the lighter ends of the centrifugal weights are moving outwards and inwards in the plane of the spring axles, the springs thereby helping both to increase the resistance at the passage over the centre of the excentrics and to increase in the corresponding degree the force for forward motion.

Figs. 10–12 show a constructional form of the check-coupling of Fig. 1. The check-coupling consists of the check-member 14, the external member or sleeve 15, which may be spring-loaded, the roller holder ring s, projections 25, the check rollers 19 and the roller springs 26, of which Figs. 11 and 12 show front and side views on an enlarged scale. Fig. 10 shows the rollers 19 in an intermediate position, at which the member 14 and the shaft 9 are movable or free in both directions. Fig. 15 shows the positions of the rollers 19, when the member 14 is movable or free only in one direction, i. e. in the direction marked by an arrow.

When the member 14 is to be brought into rotation in a certain direction, for example that marked by an arrow, the roller holder is turned in the opposite direction or the sleeve is turned in the same direction as the member 14, until the rollers 19, then resting only against the springs, are jammed between the surfaces 27 and the surface of the member 14. In this position these rollers check the motion opposite to that marked by the arrow.

Figs. 13 and 14 show constructional forms of the automatic gear device. Fig. 13 shows an intermediate eccentric 12' for one centrifugal weight 10 and two eccentrics 12, arranged on either side of the first mentioned eccentric, for the opposite centrifugal weight. The shaft 9 is further mounted in the primary shaft 1 and the fly wheel 2. The purpose of this is to obtain a complete balance in the plane and better stability in the mounting of the shaft. Fig. 14 shows a special arrangement for the mounting of the flying mass 5, said arrangement consisting therein that the part, containing the wheels 3 and 8 and the internal gear 5, is prolonged or extended a distance from the flying mass 6, whereby an intermediate part 27 is obtained for which a bearing 30 may be provided. The construction consists for the rest of the same parts as that shown in Fig. 13 and has the same reference numbers.

The automatically variable change speed gear device shown in Figs. 1–5 operates in the following manner:

1. The fulfilment of the condition stated in the paragraph 1 in the preamble, viz the automatic increase of the secondary torque, is effected in the following way: When the speed of the intermediate shaft 9 is decreased but the primary shaft 1, the fly wheel 2 and the wheels 3 continue to rotate with the same speed, the gear wheels 3 will roll upon the wheel 8 and thus cause, by means of the internal gear 5, the flying mass 6 to increase its number of revolutions whereby obviously the centrifugal force of the centrifugal weights 10 is increased, thus enabling said weights 10 to rotate the shaft 9, by means of the excentrics 12, with a speed corresponding to the difference between the primary and the secondary torque. As the excentrics are actuated by the centrifugal weights both in the positive and in the negative direction, the negative force must be utilized which utilization is effected by the shaft 9 of the check-coupling being prevented from moving in the negative direction, in stead of which the energy stored in the centrifugal weights is transmitted to the flying mass 6 and helps to increase the torque during the positive half revolution or period. In order to smooth the positive impulses the fly wheel 21 of the secondary shaft 20 is spring-loaded in relation to the intermediate shaft 9 (see Fig. 5), so that energy stored in the fly wheel during each positive half revolution or period can be delivered during the negative period.

2. At reverse motion according to the condition 2 stated in the preamble the operation is the same, with the difference, however, that the check-coupling acts in the opposite direction upon the intermediate shaft 9 and that the gear ratio is, at a certain torque, greater for reverse motion than for forward motion, because of a counteracting rolling movement in the planetary gear.

3. Braking with the motor, the condition 3 in the preamble, is achieved in that the free primary flying mass is checked by applying the brake straps 28, so that the centrifugal masses 10 are made ineffective. The motion transmission between the intermediate shaft 9 and the primary shaft 1 is now effected by means of the planetary gear. If the gas supply to the motor is now shut off, so that no force-producing explosions occur, the result is that the wheels 3 are caused by the wheel 8 to roll within the internal gear 5 and thus to rotate the motor through the pins 4, the fly wheel 2 and the primary shaft 1, the motor then offering resistance.

4. For braking with the motor according to the condition 4 in the preamble the operation is the same as that described in paragraph 3, with the addition, however, that also the fly wheel 2 ought to be braked at the same time by the brake strap 29, which is thus directly acting upon the secondary shaft 20.

5. Relative free motion, the condition 5 in the preamble, is effected thereby that the free flying mass 6 is actuated by the shaft 9 through the excentrics and the centrifugal weights, so that a torque is transmitted to the motor by the wheels 3, which roll on the wheel 8 in the direction of the rotation of the internal gear 5 and thus turn the motor.

6. Double braking of the Cardan shaft, condition 6 in the preamble, is effected in similar way as described in paragraph 4 by applying at the same time the brake straps 28 and 29.

7. By the construction according to Fig. 1 it is clear that a friction coupling may be inserted between the motor and the fly wheel 2 in the same manner as in the case of a usual gear box, whereby is obtained that no parts of the gear box need to rotate when the motor vehicle is standing and the motor is rotating idly. When the motor is direct-coupled, the check-coupling (14, 15, 19) is preferably set to neutral position (see Fig. 10) the positive and negative impulses of the excentrics then neutralizing each other.

In the constructional form according to Figs. 1–5 the free flying mass 6 and the centrifugal masses 10 may be braked and locked by the brake strap 28. At the same time the fly wheel 21 of the secondary shaft 20 may be braked and locked by the brake strap 29. The brake members 28 and 29 are coupled to a common brake lever and each provided with lock and release devices, which may be operated by the fingers at the same time as the lever is operated.

Having now described my invention, what I claim as new and desire to secure by Letters Patent is:

1. An automatic variable speed changing device comprising a primary shaft and a secondary shaft, a rotatable flying mass having gear connection with the primary shaft, centrifugal weights connected eccentrically with the secondary shaft and pivotally connected with the flying mass, and a check adjustable in reverse directions for preventing the secondary shaft from rotating reversely against the active rotational direction.

2. An automatic variable speed changing device comprising a primary shaft, a secondary shaft and an intermediate shaft, a rotatable flying mass, a planetary driving gear between the primary shaft for rotating the flying mass and intermediate shaft, centrifugal weights connecting the flying mass and intermediate shaft, and means for yieldably connecting the intermediate shaft with the secondary shaft.

3. An automatic variable speed changing device comprising a primary shaft, a secondary shaft and an intermediate shaft, a fly wheel driven by the primary shaft, a rotatable flying mass, a planetary gear connection between the fly wheel and flying mass for driving the intermediate shaft, eccentrics on the intermediate shaft, centrifugal weights connected with the eccentrics, rods pivotally connecting the weights with the flying mass, and a yieldable coupling between the secondary and intermediate shafts.

4. A device as claimed in claim 2 wherein the check device includes a clutch ring having lugs thereon, and a casing surrounding the ring and having mounted therein springs engaging the opposite sides of the lugs.

5. A device as claimed in claim 1 wherein springs are interposed between the centrifugal weights and the flying mass.

6. An automatic variable speed changing device comprising a primary shaft, a secondary shaft and an intermediate shaft having a gear thereon, a fly wheel driven by the primary shaft and having pinions thereon meshing with said gear, a rotatable flying mass geared with the pinions, the intermediate shaft having eccentrics thereon, centrifugal weights confined in the flying mass and having therein ends engaging with the eccentrics, rods pivotally connecting the outer ends of the weights with the flying mass, a rotating directional controlling member associated with the intermediate shaft, and a yielding coupling between the intermediate shaft and secondary shaft.

DAVID WERNER BERLIN.